United States Patent [19]
Prange

[11] 3,780,821

[45] Dec. 25, 1973

[54] VEHICLE DRIVE SYSTEM

[75] Inventor: James M. Prange, Dearborn Heights, Mich.

[73] Assignee: Rockwell International Corporation, Pittsburgh, Pa.

[22] Filed: Aug. 11, 1971

[21] Appl. No.: 170,690

[52] U.S. Cl............ 180/44 R, 180/24.09, 74/710.5
[51] Int. Cl............................................. B60k 17/34
[58] Field of Search................... 180/44 R, 24.09; 74/710.5; 64/30 R

[56] References Cited
UNITED STATES PATENTS

| | | | |
|---|---|---|---|
| 3,656,573 | 4/1972 | Halberg................ | 180/44 R |
| 3,557,634 | 1/1971 | Bixby.................... | 180/44 R |
| 2,228,581 | 1/1941 | Olen...................... | 180/44 R |
| 2,959,237 | 11/1960 | Hill........................ | 180/44 R |
| 3,107,763 | 10/1963 | Hill........................ | 180/44 R |
| 3,378,093 | 4/1968 | Hill........................ | 180/44 R |
| 3,400,777 | 9/1968 | Hill........................ | 180/44 R |
| 3,407,893 | 10/1968 | Hill et al................ | 180/44 R |
| 2,977,779 | 4/1961 | Steinke et al......... | 64/30 R |
| 3,171,270 | 3/1965 | Dahlberg............... | 64/30 R |
| 3,487,724 | 1/1970 | McIntyre............... | 64/30 R |

Primary Examiner—Kenneth H. Betts
Attorney—John R. Bronaugh et al.

[57] ABSTRACT

In a vehicle having spaced apart front and rear drive axle assemblies, a power plant and improved power train interconnecting the power plant with the front and rear drive axle assemblies and in which the improved power train includes a torque proportioning gear arrangement dividing torque between the front and rear drive axle assemblies, a first torque transmitting drive train interconnecting the torque proportioning gear arrangement and the power plant, a second torque transmitting drive train interconnecting the torque proportioning gear arrangement and the rear drive axle assembly, and a third torque transmitting drive train interconnecting the torque proportioning gear arrangement with the front drive axle assembly. The third torque transmitting drive train includes a clutch automatically operable to allow differential movement between the front and rear axle assemblies only upon the torque being transmitted by the third torque transmitting drive train reaching a predetermined magnitude.

1 Claim, 4 Drawing Figures

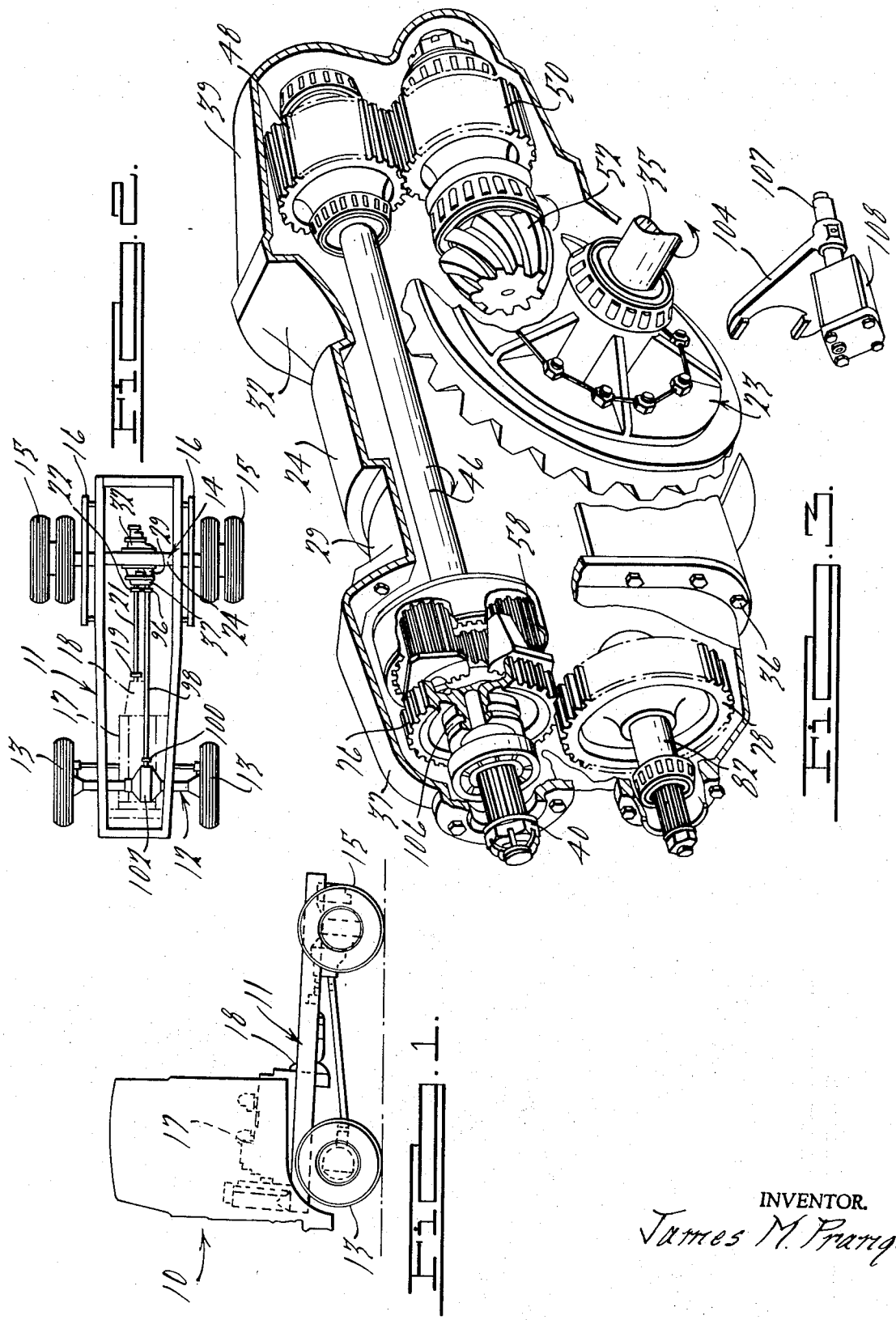

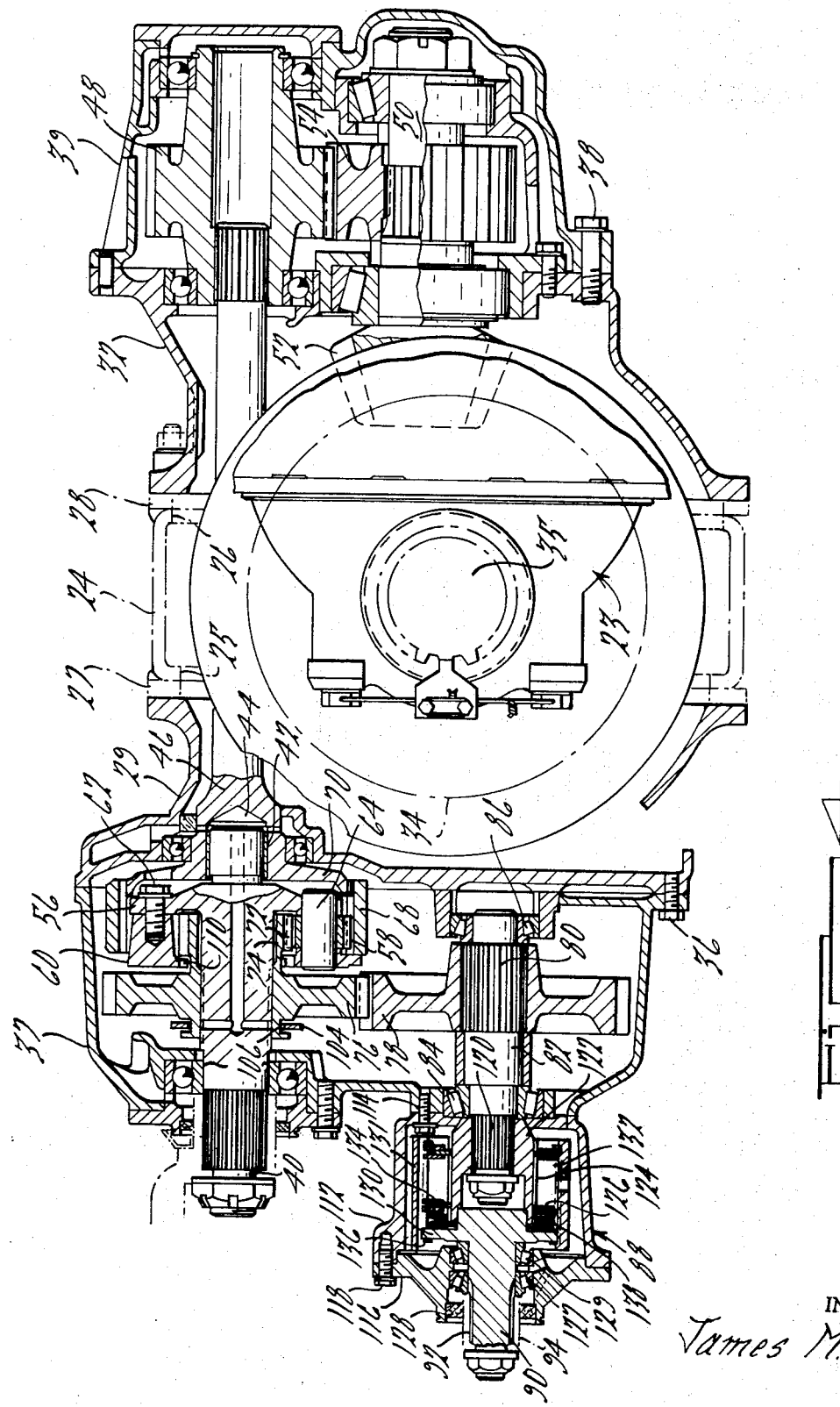

VEHICLE DRIVE SYSTEM

BACKGROUND AND SUMMARY OF INVENTION

This invention relates to an automotive drive system incorporating proportional power dividing devices and particularly to such devices as are adapted to relatively short wheel base heavy duty trucks, tractors and like vehicles wherein both the forward and rearward axles are driven from a common power plant.

Considerable attention has been devoted to the development of vehicles wherein the forward and rearward axles are driven. For example, U.S. Pat. No. 3,557,634, issued on Jan. 26, 1971, to Leo A. Bixby, entitled "Automotive Drive Train," and assigned to the assignee of this invention, discloses a power dividing device mounted on the rearward drive axle and providing for dividing torque so that about one-third of the motive power is delivered to the forward drive axle and about two-thirds of the power is delivered to the rearward drive axle. Bixby's power dividing device includes an inter-axle differential which allows differential movement between the front and rear drive axles, thereby compensating for unequal tire diameters and undulations in the road surface. A control is provided in Bixby for selectively locking out the inter-axle differential when maximum tractive effort from both the front and rear axles is desired.

Field operations have indicated a potential problem when a vehicle having a train such as described above is lightly loaded and the inter-axle differential is locked. For example, a truck tractor having both front and rear drive axles is lightly loaded when it is hauling an empty trailer or no trailer at all. It is common for a tractor operator driving such a lightly loaded vehicle to lock the inter-axle differential when maneuvering the vehicle in stop and go circumstances such as in a freight yard, especially if road surface conditions are muddy or icy. In this way sufficient tractive effort can be sent to all the wheels despite the lightly loaded condition of the vehicle that may cause one or more of the wheels to lose traction.

It has been found that braking such a lightly loaded vehicle with its inter-axle differential locked can cause front axle windup and breakage thereof. This happens because a truck tractor's rear brakes are designed to exert greater braking forces than its front brakes. Greater braking forces for the rear brakes normally are required to oppose the momentum acting on the rear axle when the vehicle is loaded as when pulling a loaded trailer. The less powerful front brakes oppose the momentum acting on the front axle which is smaller than the load momentrum on the rear axle.

When such a vehicle is lightly loaded, however, it is the front brakes which must oppose the greater vehicle momentum. This is because most of the vehicle weight, including the engine weight, then is carried by the front axle.

A lightly loaded vehicle may be subjected to front axle windup and possible breakage because upon braking, the large capacity rear brakes may function to hold the lightly loaded rear axle members against rotation before the front brakes have exerted a sufficient force to prevent rotation of the front axle half shafts. Since the inter-axle differential is locked out and both front and rear axle parts are positively mechanically connected for rotation, this condition mandates that the "weak link" in the vehicle power train must yield and allow lost motion. It has been found that in such power trains, the weak link is front axle half shafts.

It is an object of this invention to provide a vehicle drive system giving all the advantages of similar prior art systems but whereby torque windup of front axle assembly parts is limited to a predetermined maximum.

The invention solves the front axle windup problem encountered in a vehicle having spaced apart front and rear drive axle assemblies, a power plant and a power train interconnecting the power plant with the front and rear drive axle assemblies by providing an improved power train comprising a torque proportioning gear arrangement dividing torque between the front and rear drive axle assemblies, a first torque transmitting drive train interconnecting the torque proportioning gear arrangement and the rear drive axle assembly, and a third torque transmitting drive train interconnecting the torque proportioning gear arrangement with the front drive axle assembly. The third torque transmitting drive train includes a clutch automatically operable to allow differential movement between the front and rear axle assemblies only upon the torque being transmitted by the third torque transmitting drive train reaching a predetermined magnitude.

DESCRIPTION OF DRAWINGS

Other features and objects of the invention will become apparent from the following more detailed description and from the accompanying drawings, in which:

FIG. 1 is a diagrammatic side view of a truck tractor including the vehicle drive system of this invention;

FIG. 2 is a diagrammatic plan view of the vehicle shown in FIG. 1;

FIG. 3 is an enlarged perspective view, with parts broken away, of the portion of the vehicle drive system of this invention located immediately proximate the rear axle of the vehicle of FIGS. 1 and 2; and FIG. 4 is an enlarged side elevation view, partly in section and with parts broken away, of the apparatus of FIG. 3 and additionally illustrating the clutch means of the drive system of this invention.

DESCRIPTION OF THE INVENTION

Referring to FIGS. 1 and 2, a vehicle 10 includes a chassis 11 that is supported by a forward steer drive axle assembly 12 having ground engaging wheels 13 and a rearward drive axle assembly 14 having ground engaging wheels 15. Axle assembly 14 is connected to the chassis as by conventional leaf springs 16, and similar or equivalent springs (not shown) are provided between the forward axle and the chassis.

An internal combustion engine or like power plant 17 is mounted on the forward part of the chassis, and this includes a transmission unit 18 having its output connected by a universal joint 19 to a propeller shaft 21. Shaft 21 is connected through a universal joint 22 to the input side of rearward axle 14 as will later appear.

Referring now to FIGS. 3 and 4, the rearward drive axle assembly 14 comprises a conventional non-rotatable housing 23 having an enlarged intermediate section 24 within which is mounted the usual rear axle differential mechanism. As shown in FIG. 4, axle housing section 24 has front and rear openings 25 and 26 respectively surrounded by welded-on reenforcement rings 27 and 28. A forwardly projecting housing section 29 is secured over opening 25 as by a row of studs (not shown) and a rearwardly projecting housing section 32 is secured over opening 26 as by a row of studs (not shown).

Housing sections 29 and 32 are of sufficient size to provide for enclosure of the differential mechanism which is indicated therein by the ring gear 34 which drives the usual bevel gear differential unit that has its side gears connected to opposed axle shafts 35 leading to the ground engaging wheels.

Secured over an opening in the forward end of housing section 29, as by a row of bolts 36, is an inter-axle differential housing 37, and secured over the open rear end of the housing section 32, as by a row of bolts 38, is a drop gear housing 39.

The vehicle power train shown is of the type more fully described in the previously referred to Bixby patent with an added automatic clutch to be later described. Reference may be had to the said Bixby patent for a more detailed explanation of the drive train features. For purposes of this description, it is sufficient to describe the flow of power through the power train that is fully described by the Bixby patent.

In general, this power flow is as follows: A first torque transmitting drive train which includes the transmission unit 18, universal joint 19, propeller shaft 21 and universal joint 22 delivers power from the power plant 17 to an input shaft 40 that is rotatably mounted on the differential housing 37.

The inner end of shaft 40 is coaxially rotatably mounted by a bearing sleeve 42 in a recess 44 in the adjacent recessed end of shaft 46. Shaft 46 extends through the axle housing sections into the gear housing 39 where it is non-rotatably connected to the hub of a spur gear 48.

A pinion shaft 50 carrying a bevel pinion 52 meshed with bevel ring gear 34 is rotatably mounted on an axis parallel to shaft 46. Shaft 50 carries spur gear 54 non-rotatably keyed or splined thereto and meshed with gear 48.

Shaft 46 is an output from the torque proportioning means contained within housing 37. Shaft 46, spur gear set 48 and 54, shaft 50 and bevel pinion 52 form the main parts of the second torque transmitting drive train interconnecting the torque proportioning means and the bevel ring gear 34 of the rear drive axle assembly.

Torque is split between the front and rear axle assemblies as follows: Shaft 40 is formed with an integral radial flange 56 which serves as one side of a carrier rotatably mounting a circumferentially spaced series of planet gears 58. The other side 60 of the carrier is secured to flange 56 by a series of bolts 62. Fixed pins 64 extend between the sides for rotatably mounting planet gears 58.

Planet gears 58, usually three in number, are meshed with an integral ring gear 68 that is non-rotatably mounted to an enlarged radial end flange 70 on shaft 46.

Planet gears 58 are also meshed with a sun gear 72 that is integral with the hub 74 of a spur gear 76 that is axially slidably and freely rotatably mounted on shaft 40.

Gear 76 is constantly meshed with a spur gear 78 that is non-rotatably mounted as by splines 80 upon forwardly extending output shaft 82 rotatably supported by a tapered roller bearing assembly 84 in the front wall of housing 37 and a roller bearing assembly 86 in the rear wall of housing 37.

As shown in FIG. 4, a clutch assembly generally indicated by the reference numeral 88 engages output shaft 82 and in a manner to be later explained transmits power to clutch output shaft 90. At its forward end, output shaft 90 has formed thereon a splined section 92 on which is non-rotatably mounted yoke 94 of a universal joint 96. As best seen in FIG. 2, universal joint 96 is coupled to a drive shaft 98 which is connected through universal joint 100 to a conventional front axle differential mechanism. The differential mechanism is within the enlarged housing 102 of front drive axle assembly 12. The differential mechanism is in turn connected by axle shaft assemblies to wheels 13.

Clutch 88, universal joint 96, drive shaft 98 and universal joint 100 form the main parts of the third torque transmitting drive train interconnecting the torque proportioning means output shaft 82 and the differential mechanism of the front drive axle assembly.

The power train flow just described operates with the inter-axle differential as part of the torque proportioning means. As more fully described in the said Bixby patent, the inter-axle differential can be locked out by the vehicle operator.

Referring now to FIGS. 3 and 4, the operator can lock out the differential mechanism by shifting gear 76 along shaft 40 by means of a bifurcated fork 104 engaged within an annular groove 106 in a hub of gear 76. Bifurcated fork 104 is shown detached from the assembly in FIG. 3 for purposes of clarity. The fork is fixed on a slide rail 107 which projects from housing 37 to attach to a suitable actuator 108. Actuator 108 can be a solenoid or hydraulic or pneumatic type motor. Shifting of gear 76 from the position shown in FIG. 4 to the left causes sun gear 72 to engage an internal row of teeth 110 formed on carrier side 60.

With the inter-axle differential locked, power is still divided by the torque proportioning means between the drive axles, but differential drive axle movement through planet gears 58 is no longer possible.

The purpose of clutch 88 on the output of shaft 82 is to allow differential movement between the front and rear drive axles in response to certain conditions with the inter-axle differential locked. Clutch 88 is designed to slip automatically in response to sensed conditions and without the need for any manual task by the vehicle operator thereby to allow relative movement of the front axle drive train components before excessive front axle windup can occur when the inter-axle differential is locked and a lightly loaded vehicle as previously described is being braked.

As shown in FIG. 4, clutch 88 comprises a clutch assembly housing 112 which is fixedly mounted to the front wall of housing 37 as by a row of bolts 114. An end cap 116 having a central aperture therethrough is non-rotatably mounted to the housing 112 as by a row of bolts 118.

At its forward end, output shaft 82 is formed with a splined section 120 on which is non-rotatably mounted a clutch yoke 122. On its outer surface clutch yoke 122 is formed with a splined section 124 on which is non-rotatably mounted a plurality of spaced disc clutch plates 126. Extending through the central aperture of end cap 116 is the previously mentioned clutch output shaft 90 rotatably supported by two sets of oppositely tapered roller bearing assemblies 127 and 129 mounted within the end cap 116. At its forward end, output shaft 90 projects through an oil seal 128 carried by cap 116.

Clutch output shaft 90 is formed with an integral radial flange 130. The outer diameter of radial flange 130 has teeth thereon which serve to supportingly carry a barrel member 131 having an inner diameter slightly larger than the outer diameter of the radial flange 130. The internal surface of barrel member 131 has a splined section 132 formed thereon which non-rotatably mounts a plurality of spaced disc clutch plates 134 which fit between the previously referred to clutch plates 126 as is well known in the clutch art. Splined section 132 also engages the teeth of flange 130.

A radial stop 136 at one end of barrel member 131 limits axial movement of shaft 90 with respect to shaft 82. The inner end of shaft 90 is coaxially rotatably mounted by an internal bearing surface of the outer end of clutch yoke 122. A radial clutch spring 138 biases disc plate surfaces 126 and 134 into driving contact and flange 130 against stop 136.

The strength of spring 138 is determined empirically to allow differential movement between clutch output shaft 90 and torque proportioning output shaft 82 by slippage of the respective disc clutch surfaces upon the torque being transmitted by the clutch output shaft 90 reaching a predetermined magnitude. The strength of spring 138 is such that it will not yield to allow disc plate clutch surface slippage under normal power transference conditions incapable of causing front axle damage. Under normal circumstances, the level of torque necessary to cause yielding of spring 138 can only be reached when a lightly loaded vehicle with its inter-axle differential locked is being braked.

In summary, a lightly loaded vehicle, having more of its weight supported by a front drive axle than a rear drive axle, such as shown in FIG. 1, or which is hauling an empty trailer, is often operated with the inter-axle differential mechanism locked in order to achieve the maximum traction possible. Under such lightly loaded circumstances, gaining sufficient traction on normal road surfaces may be a problem. Obtaining traction on an icy or muddy road surface is particularly difficult. By locking the inter-axle differential, the driver assures that tractive effort is transmitted to all the vehicle wheels. Whenever such a lightly loaded vehicle having its interaxle differential locked must be braked, conventional rear brakes must oppose a smaller vehicle momentum applied at the rear axle than the front brakes encounter at the front axle. Conventional rear brakes are designed to exert a greater braking force than the front brakes because the rear axle normally supports a much larger weight, such as a loaded trailer, than the weight of the vehicle engine supported by the front axle. Braking a lightly loaded vehicle with its differential locked causes the rear brakes to grab and hold the rear axle before the front brakes can arrest movement of the front axle. By adding the automatic clutch shown in FIG. 4, differential movement between the front and rear axle is possible. A clutch of the type described will automatically allow slippage of the surfaces of disc clutch plates 126 and 134 upon the torque being transmitted by shaft 90 reaching the predetermined magnitude necessary to overcome spring 138. This predetermined magnitude is of a level safely below that which would cause torque windup and damage to the front axle assembly.

Until the predetermined level of torque magnitude is reached, the clutch mechanism functions to automatically allow torque transference between output shaft 82 and shaft 90.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed is:

1. In a truck tractor having spaced apart front and rear drive axle assemblies including front and rear drive axle housings and drive axle shafts within said housings, a chassis at least partially supported by said drive axle assemblies, a power plant supported by said chassis, front and rear brakes connected to said front and rear assemblies respectively and selectively operative to retard movement of said truck tractor, said rear brakes being capable of exerting a greater braking force than said front brakes and power train means interconnecting said power plant and said front and rear drive assemblies, said power train means including:

torque proportioning means dividing torque between said front and rear axle assemblies and including interaxle differential means and selectively operable means locking said interaxle differential means, said torque proportioning means being positioned within said rear drive axle housing forward of the rear drive axle shafts;

first torque transmitting means interconnecting said torque proportioning means and said power plant;

second torque transmitting means interconnecting said torque proportioning means and said front drive axle assembly;

said third torque transmitting means including automatically operable slip clutch means operative to limit the magnitude of torque transmitted to said front drive axle assembly to a predetermined level when said interaxle differential is in both locked and unlocked conditions;

said clutch means including a clutch housing defining a chamber therein, said chamber containing power transmitting output means of said torque proportioning means, and interfacing friction clutch means, said clutch housing being secured to and rigid with said rear drive axle housing and located forward of said rear axle drive shafts.

* * * * *